US007894925B1

(12) United States Patent
Peters

(10) Patent No.: US 7,894,925 B1
(45) Date of Patent: Feb. 22, 2011

(54) METHOD FOR MAKING A SEAMED RADOME FOR AN ARRAY ANTENNA AND RADOME WITH OPTIMAL SEAM LOCATIONS

(75) Inventor: Christopher W. Peters, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 102 days.

(21) Appl. No.: 12/038,043

(22) Filed: Feb. 27, 2008

(51) Int. Cl.

| | |
|---|---|
| ***G06F 19/00*** | (2006.01) |
| ***G05B 13/02*** | (2006.01) |
| ***G06F 15/18*** | (2006.01) |
| ***H01Q 1/42*** | (2006.01) |

(52) U.S. Cl. ........................ 700/118; 700/28; 700/36; 700/98; 706/13; 343/872

(58) Field of Classification Search .................. 700/28, 700/29, 36, 47–49, 98, 117, 118, 119, 182; 706/13, 62; 382/141, 151; 343/872
See application file for complete search history.

(56) References Cited

U.S. PATENT DOCUMENTS

| | | | | |
|---|---|---|---|---|
| 3,871,001 | A * | 3/1975 | Myers | 343/872 |
| 4,450,579 | A * | 5/1984 | Nakashima et al. | 382/151 |
| 4,728,962 | A * | 3/1988 | Kitsuda et al. | 343/872 |
| 7,151,504 | B1 * | 12/2006 | Boatman et al. | 343/872 |
| 2008/0051922 | A1 * | 2/2008 | Lin et al. | 700/98 |

* cited by examiner

*Primary Examiner*—Sean P Shechtman
(74) *Attorney, Agent, or Firm*—Duane Morris LLP

(57) ABSTRACT

A method for determining the seam location for each layer of a multilayer radome for use with an array antenna includes the steps of quantizing the radome thickness, and forming an image of the quantized thickness vs. line array position. Seam locations are assigned for an original population, and a genetic algorithm is iterated to optimize a cost function. The cost function is the level of all sidelobes other than the main lobe. The result of the genetic algorithm is an optimized set of seam locations. The radome is built with the seam locations corresponding to the optimized locations.

6 Claims, 7 Drawing Sheets

501

| | | | | | | | | | | | | | | | | | | | | | | | | | | |
|---|---|---|---|---|---|---|---|---|---|---|---|---|---|---|---|---|---|---|---|---|---|---|---|---|---|---|
| LAYER 1 | 0 | 0 | 1 | 1 | 1 | 1 | 1 | 0 | 0 | 0 | 0 | 0 | 1 | 1 | 1 | 1 | 1 | 0 | 0 | 0 | 1 | 1 | 1 | 1 | 1 | 0 |
| LAYER 2 | 0 | 0 | 0 | 0 | 0 | 0 | 1 | 1 | 1 | 1 | 1 | 1 | 1 | 1 | 1 | 1 | 0 | 0 | 0 | 1 | 1 | 1 | 1 | 1 | 0 | 0 |
| LAYER 3 | 0 | 0 | 0 | 1 | 1 | 1 | 1 | 1 | 0 | 0 | 0 | 0 | 0 | 0 | 1 | 1 | 1 | 1 | 1 | 0 | 0 | 1 | 1 | 1 | 1 | 1 |

METHOD FOR MAKING A SEAMED RADOME FOR AN ARRAY ANTENNA AND RADOME WITH OPTIMAL SEAM LOCATIONS

FIELD OF THE INVENTION

Background of the Invention

Electromagnetic radiators in the form of antennas are extensively used. Especially when intended for operation at frequencies above about one Gigahertz (GHz), antennas may be fragile as a result of their relatively small size. Such antennas may require protection in the form of a dielectric covering generally known as a radome. The term "radome" came into use at a time at which large movable parabolic reflector type antennas were mounted outdoors, and required protection against wind loading, and incidentally against the effects of snow and rain. The typical protective cover for a movable parabolic reflector had the appearance of a portion of a sphere or dome. In current parlance, a "radome" may be of any shape. One common shape is that used with planar array antennas, which is a planar or almost-planar shape.

When making a simple radome, it is often sufficient to use a single layer of dielectric material, which provides protection against the elements. However, the functions of a radome are not limited to protection against the elements. More particularly, they can be used to adjust or effect the radiation pattern. This adjustment or effect is often accomplished by the use of multiple layers, each having a different dielectric constant. Thus, multiple layers of radome are often used, with the characteristics of the layers being selected for various purposes. The outermost layer is often selected for a combination of weather and ultraviolet resistance together with low electromagnetic transmission loss.

FIG. 1 illustrates a section of a three-layer flat or planar radome 10 exploded away from the array antenna 12 which it protects. In FIG. 1, a generally planar radome 10 is made up of three distinct layers or sheets of different dielectric materials, namely an outer layer 100L, a middle layer 10ML, and an inner layer 10IL, as can be seen at the exposed edge 10E. The outer layer 10OL defines an upper broad side 100LU. Outer layer 10OL is selected of a material capable of withstanding the external environment, whether it be heat and sandstorms or cold and marine. The dielectric characteristics of the middle layer 10ML and of the inner layer 10IL are selected for best performance in conjunction with the characteristics of the outer layer 10OL.

Antenna 12 of FIG. 1 includes a substrate 14, which may be of a generally planar electromagnetically reflective material constituting a ground plane, or which alternatively may be electromagnetically absorptive, depending upon the desired antenna radiation pattern and response. Antenna 12 also includes a plurality of individual or elemental antenna elements, four of which are designated as 16*a*, 16*b*, 16*c*, and 16*d*. While illustrated as crossed dipoles, the antenna elements of array antenna 12 may be of any kind, as is well known in the art. When it is desired to operate the antenna elements of FIG. 1 as an array antenna, the antenna elements are "fed" with signals from a "beamformer."

Those skilled in the arts of antenna arrays and beamformers know that antennas are transducers which transduce electromagnetic energy between unguided- and guided-wave forms. More particularly, the unguided form of electromagnetic energy is that propagating in "free space," while guided electromagnetic energy follows a defined path established by a "transmission line" of some sort. Transmission lines include coaxial cables, rectangular and circular conductive waveguides, dielectric paths, and the like. Antennas are totally reciprocal devices, which have the same beam characteristics in both transmission and reception modes. For historic reasons, the guided-wave port of an antenna is termed a "feed" port, regardless of whether the antenna operates in transmission or reception modes. The beam characteristics of an antenna are established, in part, by the size of the radiating portions of the antenna relative to the wavelength. Small antennas make for broad or nondirective beams, and large antennas make for small, narrow or directive beams. A highly directive antenna beam is said to have greater "gain" than a less directive beam. When more directivity (narrower beamwidth or more gain) is desired than can be achieved from a single antenna, several antennas may be grouped together into an "array" and fed together in a phase-controlled manner, to generate the beam characteristics of an antenna larger than that of any single antenna element. The structures which control the apportionment of power to (or from) the antenna elements are termed "beamformers," and a beamformer includes a beam port and a plurality of element ports. In a transmit mode, the signal to be transmitted is applied to the beam port and is distributed by the beamformer to the various element ports. In the receive mode, the unguided electromagnetic signals received by the antenna elements and coupled in guided form to the element ports are combined to produce a beam signal at the beam port of the beamformer. A salient advantage of sophisticated beamformers is that they may include a plurality of beam ports, each of which distributes the electromagnetic energy in such a fashion that different beams may be generated simultaneously.

In general, the presence of the radome 10 of FIG. 1 overlying the antenna 12 adversely affects the performance of the antenna, at least in that the unavoidable losses of the radome in transmitting or passing electromagnetic radiation decreases the net power efficiency of the antenna-radome combination. In addition, the radome may perturb the radiation pattern which would otherwise be generated by the combination of the array elements as fed by the beamformer.

The description herein includes relative placement or orientation words such as "top," "bottom," "up," "down," "lower," "upper," "horizontal," "vertical," "above," "below," as well as derivative terms such as "horizontally," "downwardly," and the like. These and other terms should be understood as to refer to the orientation or position then being described, or illustrated in the drawing(s), and not to the orientation or position of the actual element(s) being described or illustrated. These terms are used for convenience in description and understanding, and do not require that the apparatus be constructed or operated in the described position or orientation.

Improved andor alternative radome configurations are desired, together with methods therefore.

SUMMARY OF THE INVENTION

A method for determining the location of seams in a multilayer radome for an array of radiating elements, the radome having thickness and first and second lateral dimensions defining broad sides. The method comprises the step of quantizing the thickness of the radome into plural layers, each layer having characteristics different from those of adjacent layers. For each of the layers of the radome, a plurality of different possible radome seam location combinations are generated, where each of the seams overlies a plurality of radiating elements of the array, to thereby generate a population of possible radomes. At least two child radomes are created from each pair of parent radomes in the population. An image is formed from each parent and child radome in each population. Each of the images is two-dimensional Fourier transformed, to thereby generate Fourier transformed images. Each of the Fourier transformed images is assessed by means of an optimization process to thereby select an optimal radome seam combination defining the seam locations in each layer of the radome. A radome is made having the selected number of layers with the selected characteristics and having the optimal radome seam locations in relation to the line arrays.

In a particular mode of this method, the step of forming an image comprises the further steps of generating a matrix with a number of rows corresponding to the number of layers in the radome and with a number of columns corresponding to the number of radiating elements lying under the radome. In each column of the matrix representing a seam overlying a radiating element, entering ones in the row corresponding to the layer in which the seam occurs. In each column of the matrix representing a radiating element affected by the presence of an adjacent seam, entering ones in the row corresponding to the layer in which the seam occurs. Zeroes are entered in those rows and columns of the matrix corresponding to radome layers overlying line arrays in which there are no seams.

According to another aspect of the invention, a method for making a radome for an array antenna including a plurality of radiating elements comprises the steps of selecting characteristics of the array antenna, and the number and characteristics of the layers of the radome. The method also includes the steps of quantizing the thickness of the radome into layers, and generating a plurality of possible seam location combinations, where each seam location overlies one of the line arrays. The seam locations are optimized to minimize the effect of the radome on the array antenna. A radome is made for the array antenna with the seams at the optimized locations. In a particularly advantageous mode of this aspect of the method of the invention, the step of optimizing includes the step of using a genetic algorithm.

In this particularly advantageous mode, the genetic algorithm includes the steps of creating a generation of a particular size in which radomes have locations overlying line arrays. Parent couples are determined in the generation. For each of the parent couples, children are created, preferably by a crossover approach. The children are mutated to create mutated children, and the mutated children are inserted into the population of a generation to thereby create a further population. A cost function or function of the further population is evaluated, where the cost factor is the maximum amplitude or level of any of the sidelobes other than the main lobe. A number of "people" having the lowest cost are selected or kept from the further population, to form a new generation. The steps of determining parent couples, creating children, mutating children, inserting, evaluating a cost function, and keeping a number of people having the lowest cost are repeated. After the last repetition, the optimum seam location is deemed to be the one having the lowest cost factor, and a physical radome is made.

A protective cover for an array antenna according to an aspect of the invention comprises a first, protective outer dielectric layer made from separate sheets of first dielectric material joined together at seams. A second, middle dielectric layer is provided, made from separate sheets of second dielectric material joined together at seams, where the second dielectric material has different characteristics from the first dielectric material. A third, inner layer of radome is provided, which third layer is made of separate sheets of third dielectric material joined together at seams, where the third dielectric material has different characteristics from at least the second dielectric material. A first broad surface of the middle dielectric layer is juxtaposed with a broad surface of the outer dielectric layer, and a broad surface of the inner layer is juxtaposed with a second broad surface of the middle layer, with the seams of the outer, middle and inner layers being nonregistered. In a particularly advantageous embodiment of this cover, the seams of the outer, middle, and inner layers are each centered over a line array of the array antenna.

According to another aspect of the protective cover, the dielectric sheets defining the first, second, and third layers are rectilinear and have substantially the same transverse dimensions.

DESCRIPTION OF THE INVENTION

It is difficult to make large multi-layer radomes in one piece. According to an aspect of the invention, multilayer radomes are made up of sections which are joined at seams. It has been found that the seams undesirably affect the electromagnetic radiation that is transduced (transmitted andor received) by the underlying antenna. According to an aspect of the invention, each layer of a radome is separately made up of several sheets of the dielectric material appropriate to the layer, joined together with seams. The seams may be "vertical" or "horizontal." Terms concerning mechanical attachments, couplings, and the like, such as "connected," "attached," "mounted," refer to relationships in which structures are secured or attached to one another either directly or indirectly through intervening structures, as well as both movable and rigid attachments or relationships, unless expressly described otherwise. Once the individual layers are completed by seaming joining together several sheets of the same dielectric material, the individual layers can be juxtaposed and joined to form the radome.

Figure 1:
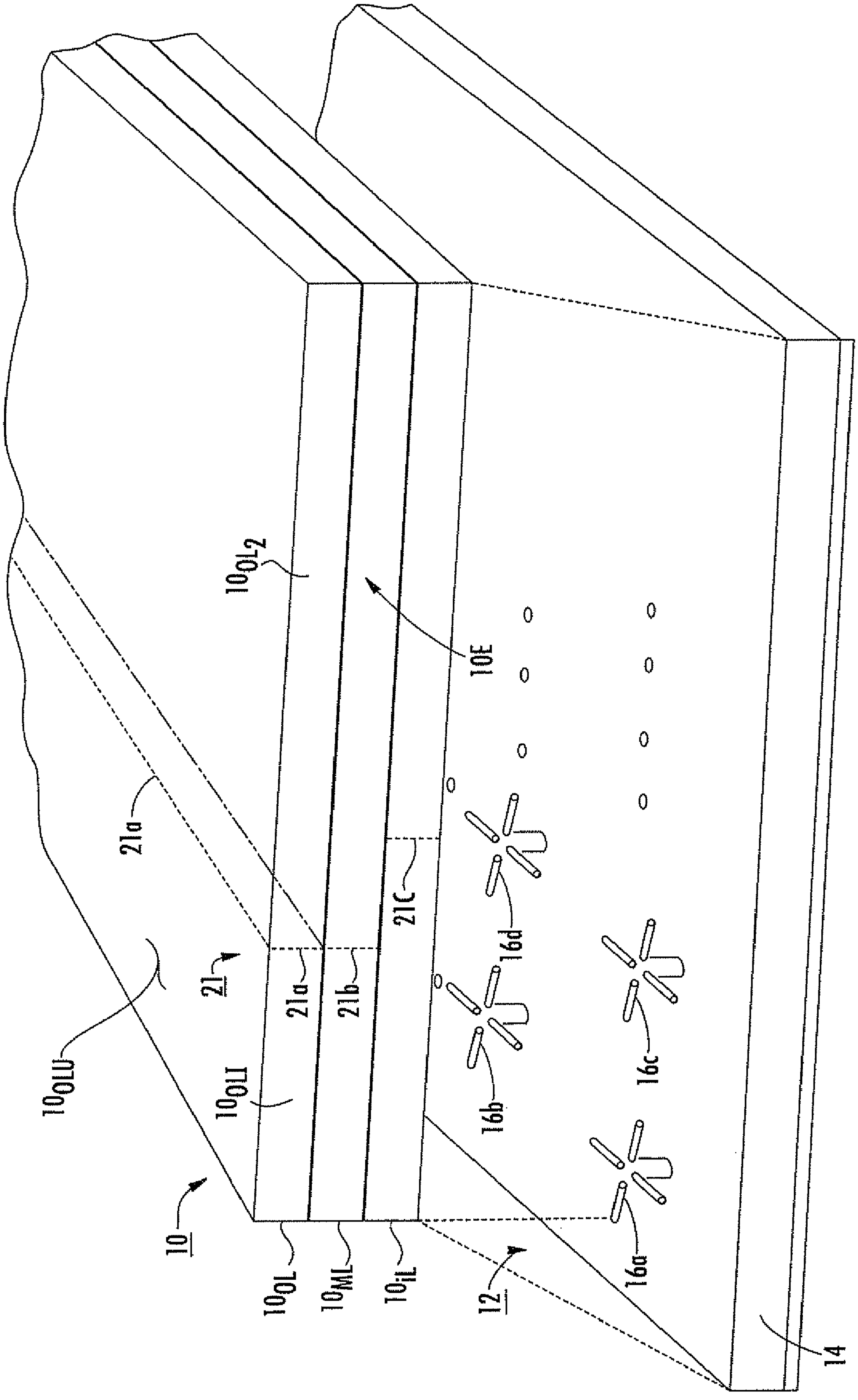
FIG. 1 is a simplified perspective or isometric illustration of a portion of a multilayer radome overlying an array of electromagnetic radiators forming an array antenna.

It has been found that the seams, when registered between or among the various layers of the radome, can adversely perturb the performance. In this context, “registered” means that the vertical seams of one layer overlie or underlie the vertical seams of another layer, and horizontal seams of one layer overlie or underlie horizontal seams of another layer. FIG. 1 shows some seams of a set 21 of seams in the various layers of the radome 10. In FIG. 1, dash line 21*a* represents a seam in outer layer $\mathbf{10}_{OL}$, and dot-dot-dash line 21*b* represents a seam in middle layer $\mathbf{10}_{ML}$. Clearly, seams 21*a* and 21*b* are mutually registered with each other. Also in FIG. 1, 21*c* represents a seam in lower or inner layer $\mathbf{10}_{IL}$, which is not registered with seams 21*a* or 21*b*. Each seam divides its associated layer, meaning that each layer is made up of plural portions juxtaposed at the seam location. In FIG. 1, outer layer $\mathbf{10}_{OL}$ includes two distinct layer portions, which are designated $\mathbf{10}_{OL1}$ and $\mathbf{10}_{OL2}$, which join at seam 21*a*.

According to an aspect of the invention, the seams of the various layers of a radome are staggered so as not to be registered. The staggering may be vertical or horizontal, but both vertical and horizontal staggering is/are preferred.

Figures 2A, 2B:
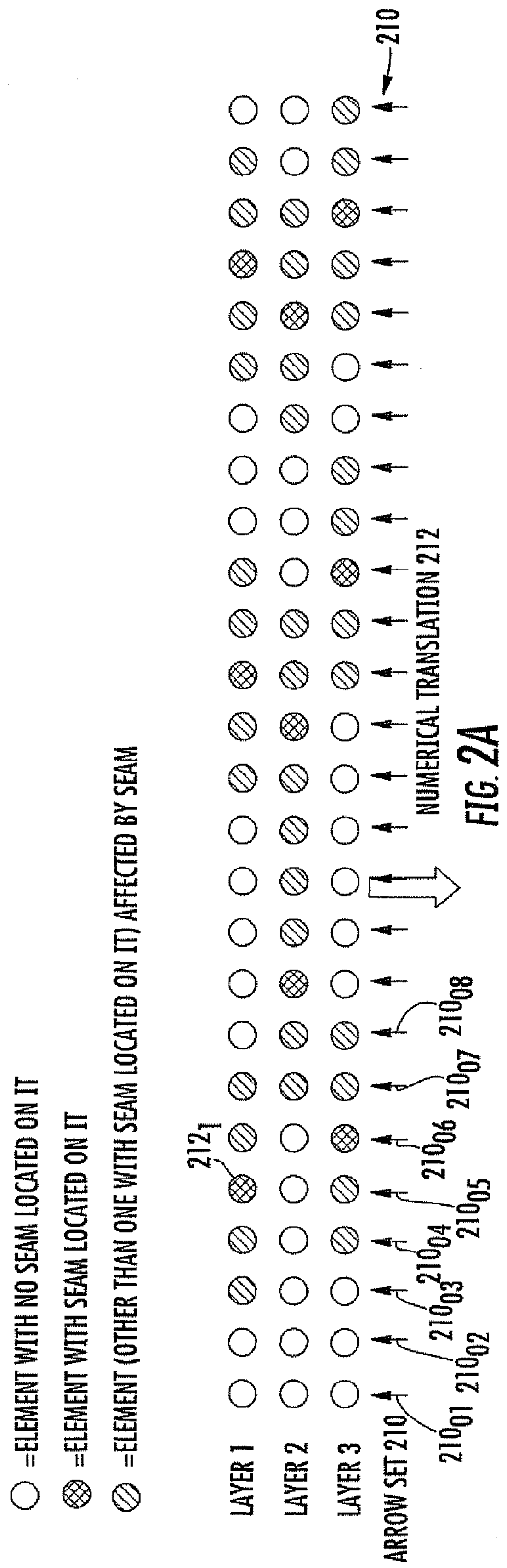
FIG. 2A is a simplified elevation representation or view of an edge of the structure of FIG. 1, showing the layers of the radome and the locations of the underlying electromagnetic radiators.
FIG. 2B illustrates the generation of a matrix of ones and zeroes corresponding to characteristics of the structure of FIG. 2A.

According to a further aspect of the invention, a method is used to identify optimal locations for the staggered seams. FIG. 2A is a simplified diagram illustrating an edge-on view of the edge 10E of radome 10 of FIG. 1, with the vertical direction quantized by the number of layers and the horizontal direction quantized according to the locations of the antenna elements of the underlying antenna array. In FIG. 2A, upper Layer 1 corresponds to the outer layer 100L of FIG. 1, middle Layer 2 corresponds to middle layer 10ML, and bottom Layer 3 corresponds to inner layer 10IL. In the horizontal direction of FIG. 2A, the location of an underlying array element is indicated by an upwardly-directed arrow of a set 210 of arrows. More particularly, upwardly-directed arrow $\mathbf{210}_{01}$ identifies the location under the radome of FIG. 2A at which an antenna element lies, and in particular at which antenna 16*a* of FIG. 1 lies. Similarly, upwardly-directed arrows $\mathbf{210}_{02}$, $\mathbf{210}_{03}$, $\mathbf{210}_{04}$, $\mathbf{210}_{05}$, $\mathbf{210}_{06}$, $\mathbf{210}_{07}$, and $\mathbf{210}_{08}$ identify locations under the radome at which other antenna array elements lie. Other arrows of set 210 which are not designated likewise identify the locations of other elements of the array antenna. The horizontal dimension in FIG. 2A is quantized by the location of a line array of underlying antenna elements. Thus, arrow $\mathbf{210}_{01}$ of FIG. 2 corresponds to the location of the line array of elements 16*a* and 16*b* of FIG. 1, and arrow 21002 of FIG. 2A corresponds to the location of the line array of antenna elements 16*c* and 16*d* of FIG. 1. Other arrows similarly indicate the locations of other line arrays of the array antenna 12 of FIG. 1.

Certain assumptions are made for analytic purposes. Seams of each dielectric layer are assumed to be located directly over an array element, which perforce means that the seam follows a line of antenna elements or radiators of the array. The beamformer (not illustrated) used in conjunction with the array antenna provides a uniform amplitude taper from element to element. The error attributable to the presence of a seam overlying a line of antenna elements of the array extends to ±2 elements from the seam. Each seam is assumed to provide the same amount of amplitude and phase error as other seams. For purposes of an example, the panel or sheet widths to be combined are assumed to range from a minimum antenna array panel width of about 12" (inches) to a maximum panel width of about 35", corresponding to about 8 and 21 antenna elements, respectively. The total desired panel width is 152", corresponding to about 92 antenna elements.

In FIG. 2A, the crosshatched circles in a given layer represent the location of a seam in that particular layer. Thus, the crosshatched circle $\mathbf{212}_1$ in layer 1 represents a seam in layer 1, overlying a line array of antenna elements, and therefore affecting the performance of the line array of antenna elements. The presence of a singly hatched (but not crosshatched) circle represents line arrays of antenna elements which are not overlain by a seam, but the performance of which are nevertheless affected by an adjacent (but not overlying) seam in the layer. Non-hatched circles represent line arrays which are not overlain by a seam and which are not affected by a nearby seam. It will be noted that the assumption is made that the presence of a seam (crosshatched circle) affects not only the underlying line array, but also affects (hatched circles) the performance of line arrays one and two array spacings from the seam. Thus, the presence of a seam in a layer of the dielectric radome affects a total of five of the closest underlying line arrays of antenna elements.

According to an aspect of the invention, the optimal locations for the seams is or are determined by converting the information of FIG. 2A into an image, and performing a two-dimensional Fourier transform of the image, to thereby yield qualitative information of the error effects as a function of angle. This is performed for a plurality of potential radome structures generated in a genetic fashion, and the optimal radome seam locations as so determined are selected for fabrication of the actual radome.

Part of the image creation for the structure illustrated in FIG. 2A is illustrated in conjunction with FIG. 2B. FIG. 2B is a representation of a matrix of ones and zeroes which is generated from the information of FIG. 2A. More particularly, the matrix has a number of columns corresponding to the total number of radiating elements (or possibly line arrays) in the entire antenna-radome combination (the previously mentioned example mentioned 92 elements, but FIG. 2B shows only 26 elements to avoid overcrowding the illustration). The number of rows in the matrix of FIG. 2*b* corresponds to the number of layers of the radome (three in the example). Each element of the matrix of FIG. 2B is populated with a one (1) or a zero (0), depending upon whether or not that line array portion of the layer in question is affected by a seam in the radome. Thus, the layers and line-array positions identified in FIG. 2A by either hatched or crosshatched circles are given a matrix value of “1,” while the layers and line-array positions identified by open circles are given a matrix value of “0.”

Figure 3A:
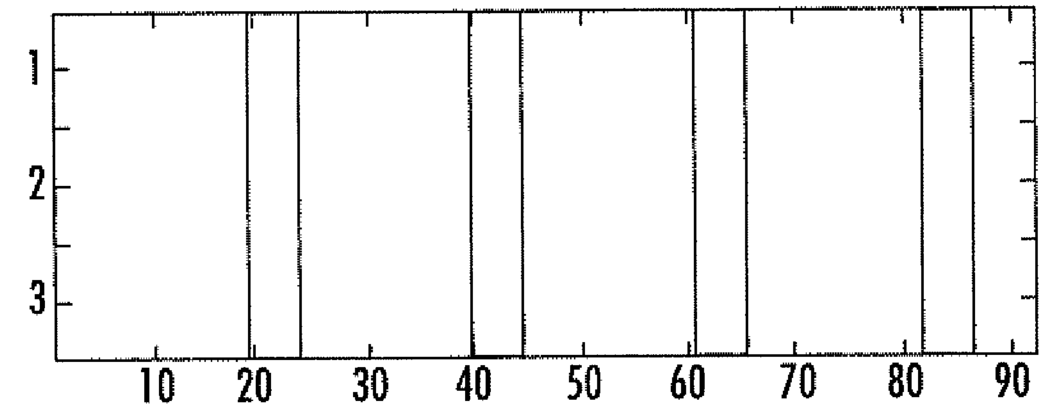
FIG. 3A is a simplified edge representation of a particular periodic seam spacing in a three-layer radome.
Figure 3B:
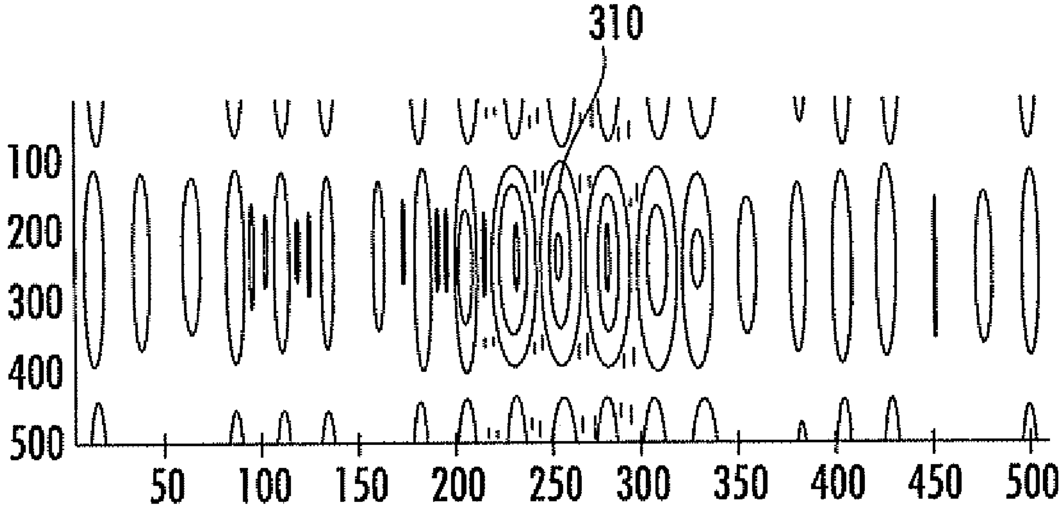
FIG. 3B represents the 2D Fourier transformation of the image of FIG. 3A.
Figure 4A:
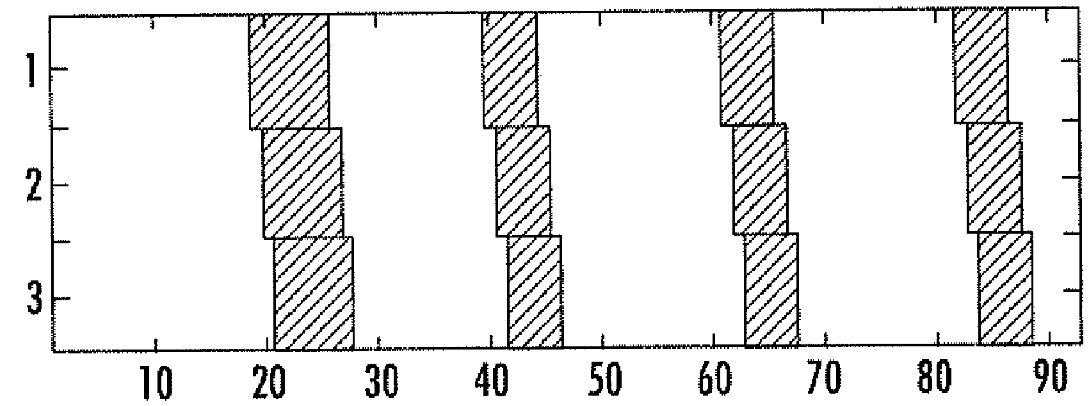
FIG. 4A is a simplified edge representation similar to FIG. 3A of a radome in which seams are staggered relative to the seams of the next adjacent layers.
Figure 4B:
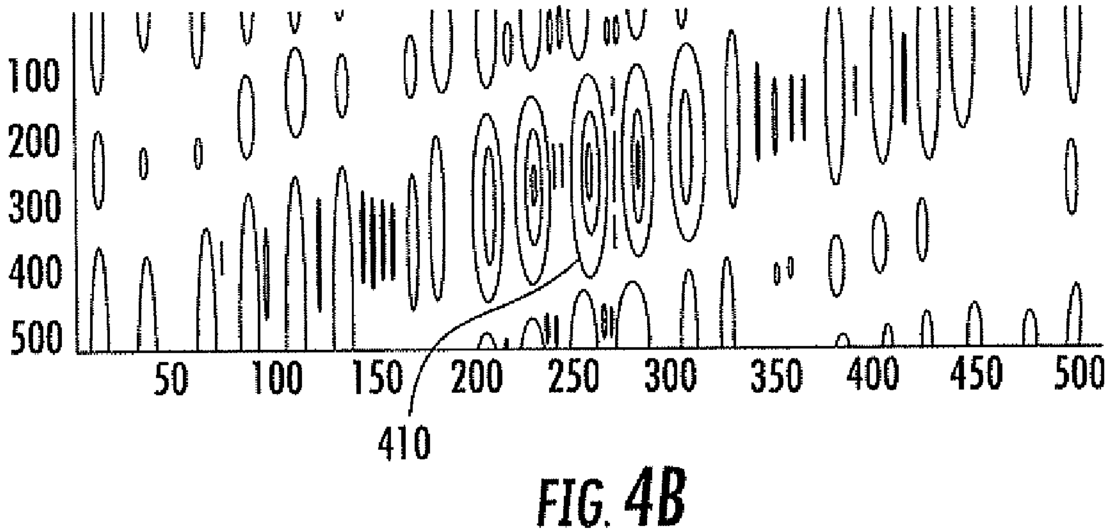
FIG. 4B is the 2D Fourier transform illustrating the effect on the antenna radiation pattern of the radome structure of FIG. 4A.

FIG. 3A is a representation of a particular periodic seam spacing. In FIG. 3A, the ordinate values represent the three layers of the radome, and the abscissa represents the number of radiating elements. In FIG. 3A, the seams occur in all three layers at the positions of the $21^{st}$, $42^{nd}$, $63^{d}$, and $84^{th}$ line arrays, and thus are aligned or registered and have periodic spacing. FIG. 3B represents the 2D Fourier transformation of an image for FIG. 3A. In FIG. 3B, the ordinate and abscissa values are the index values of the discrete Fourier transform. There is no physical main lobe. The main lobe designated 310 is purely mathematical for analysis. The analysis looks at the maximum value of the two-dimensional plane to assess the periodic error. The angle of the sidelobes are the same angle as the relative orientation of the seams. All lobes other than the main lobe are undesired lobes attributable to the regular seam structure illustrated in FIG. 3A. FIG. 4A is a representation of seams that are staggered relative to the seams of the next adjacent layers, so that the seam of the middle layer is offset by one line array spacing from that of the outer layer, and the seam of the inner layer is offset by one line array spacing, in the same direction, relative to the middle layer. The spacing of the seams continues to be periodic within each layer. FIG. 4B is the 2D Fourier transform illustrating the effect on the antenna radiation pattern of the radome structure of FIG. 3C. As can be seen by comparing FIGS. 3B and 45, the effect of the 1-array-line offset is to slant the distribution of errors in the direction of the seams in the radome. The main lobe can still be identified as 410.

While optimization of the seam location is desired, ordinary optimization techniques may not provide suitable solutions because the large dimensions of the structure might result in identification of local minima rather than a global minimum. For this reason, a genetic algorithm is used to establish the optimum seam locations. In one mode of a method according to the invention, each chromosome was 4 bits long, corresponding to four bits for each seam location. One hundred parents were used per generation, the crossover probability was 0.2, and the mutation probability 0.1.

The cost function used in the optimization indicates how strongly the results match the desired results. The cost function is the maximum value of the Fourier transformed image with the main lobe removed. The higher the cost function, the worse the results. A penalty or increase in cost is assessed for each seam location which does not meet the specified conditions. In this particular mode, the cost function is defined as the maximum intensity of the 2D Fourier transform, excluding the main lobe. Thus, the cost function measures the peak amplitude of the unwanted side lobes.

Figure 5A:
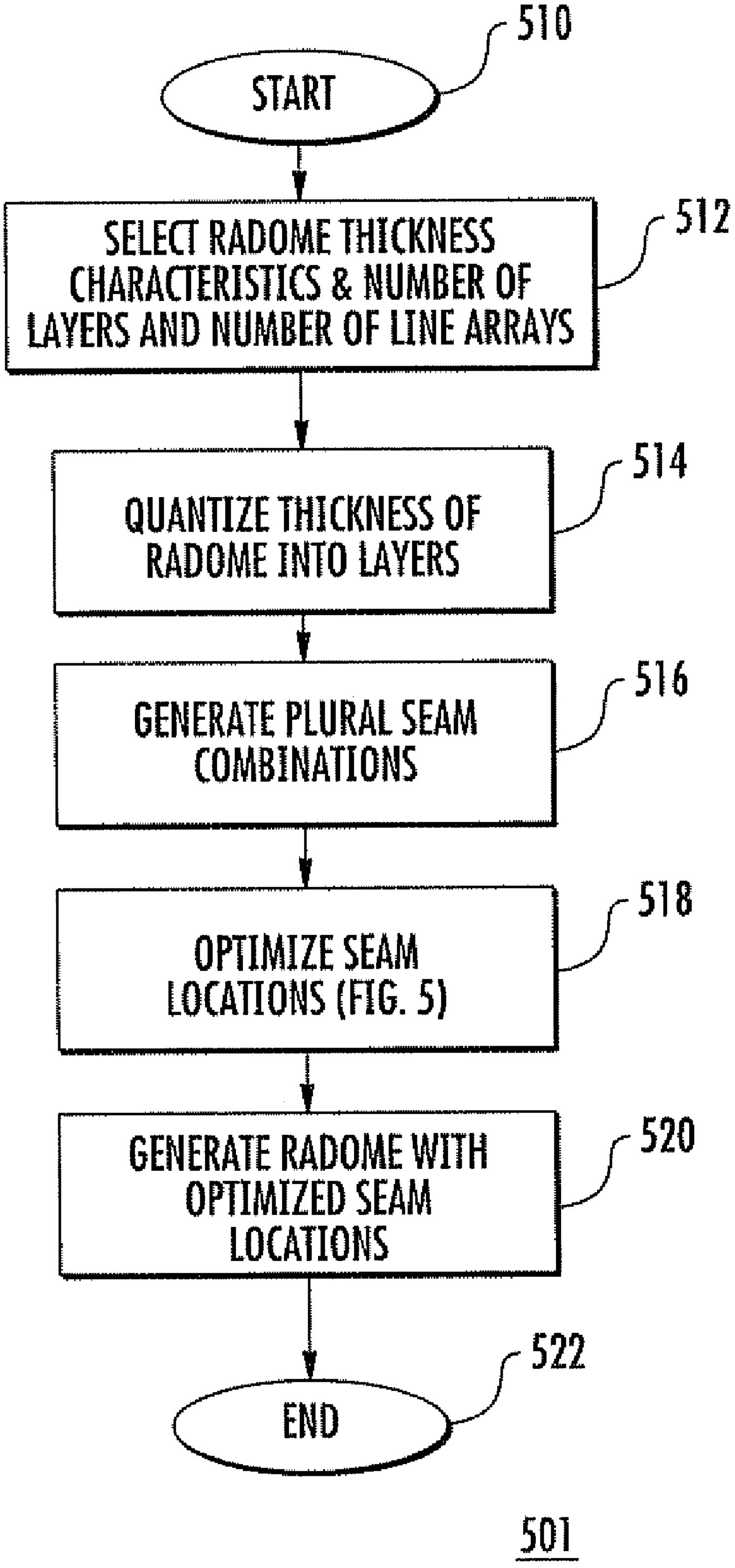
FIGS. 5A and 5B are a simplified flow diagrams or charts illustrating various steps of a method according to an aspect of the invention for determining the optimal locations of the seams in the various layers of a multilayer radome.
Figure 5B:
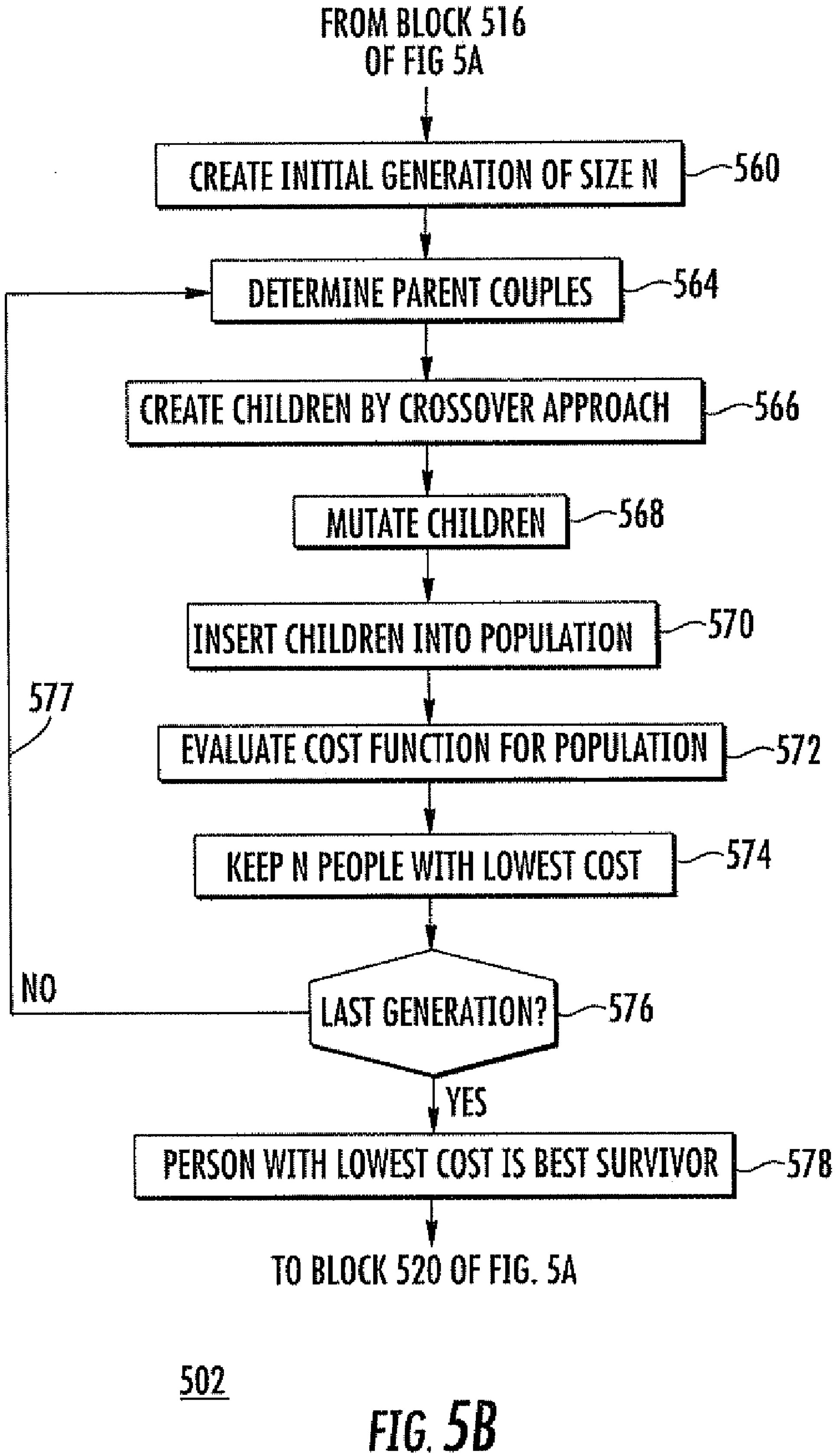

FIGS. 5A and 5B together represent a simplified flow diagram or chart 501, 502 illustrating various steps of the method for determining the optimal locations of the seams in the various layers of the multilayer radome. In FIG. 5A, the logic or control flow 501 begins at a START block 510, and flows to a block 512. Block 512 represents the selection of radome characteristics such as thickness and dielectric constant, and also the characteristics of the antenna array which it will overlie. Block 514 represents the quantization of the various layers, and block 516 represents the generation of plural seam combinations for an initial population. The seam locations are optimized, as suggested by block 518. When an optimal seam location arrangement has been determined, a radome having seams in the optimized locations can be made or generated. The logic 501 ends at an END block 522.

In a preferred mode of the method of FIG. 5A, the optimization is performed by a genetic algorithm, illustrated as the logic 502 of FIG. 55. In FIG. 5B, the method flow or logic 502 begins with a block 560, which represents the creation of an initial generation of size N. The creation of the initial generation is accomplished as follows. Each antenna is represented by a string of binary values. A range of binary values represents the location of the seam. So if it takes M binary values to represent the location, and there are N seams, and there are P layers, each radome will be represented by a binary string of M*N*P length. The initial values are randomly chosen for each radome in the initial population.

From block 560 of FIG. 5B, the logic 502 flows to a block 564, representing the identification or determination of the parent couples. Parent couples are randomly chosen. Each parent can only be "married" to one "spouse" at both the initial and future iterations. During the first iteration through the logic, the parent couples correspond with the initial generation. During iterations following the first, the identification of the parent couples is performed randomly.

Children of the parent couples are generated by a crossover approach, as represented by block 566 of FIG. 5B. This step creates children having some of the characteristics of the parents, with the crossover probability of 0.2 in the example. From block 566, the logic of FIG. 5 flows to a block 568, which represents the mutation of the binary value strings of the children, with the mutation probability of 0.1 in the example. Block 570 represents the insertion of the children into the population.

Block 572 of FIG. 5B represents the evaluation of the cost function for the population. As mentioned above, the cost function is the maximum or peak amplitude of any of the sidelobes, other than the main lobe, of the 2-D Fourier transformed image. The population is ranked by cost, and the N people having the lowest cost are kept, as suggested by block 564. The remainder of the high-cost people are discarded. The logic 502 of FIG. 5B flows to a decision block 576, which determines if the number of generations or iterations has reached the specified number. If not, the logic leaves the NO output of block 576, and returns to block 574, for the determination of the parent couples in the new population.

The logic 502 of FIG. 5B iterates around the various blocks until decision block 576 finds that the last generation has been processed, at which time the logic leaves decision block 576 by the YES output, and arrives at a block 578, which evaluates the survivors in the population to identify the lowest-cost person. That person is deemed to be the optimum, as suggested by block 578.

The optimum identified by the logic of FIG. 5B specifies the seam locations for the radome/array combination in question. Once the optimum seam locations have been determined, a radome is made with the specified number of layers, as suggested by block 520 of FIG. 5A, for coaction with the specified array, with the seam locations selected in accordance with the characteristics of the lowest-cost member of the last population.

Figure 6A:
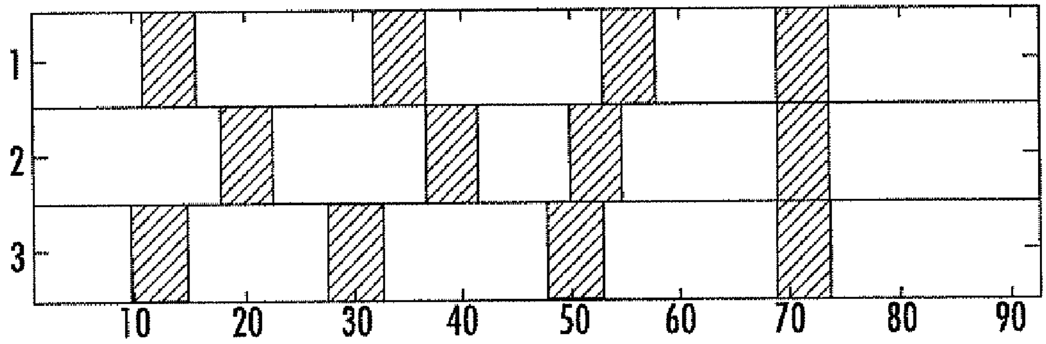
FIG. 6A is a simplified edge representation similar to FIG. 3A of a radome in which seams are staggered by optimization according to an aspect of the invention.
Figure 6B:
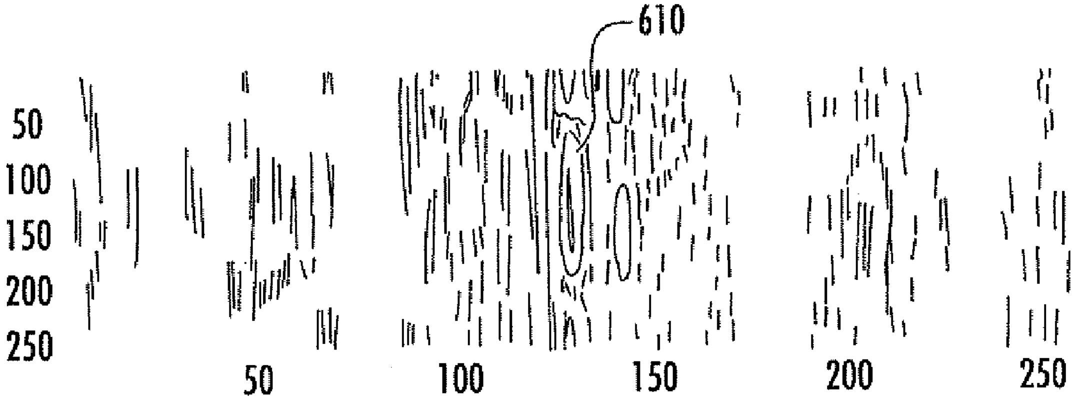
FIG. 6B is the 2D Fourier transform illustrating the effect on the antenna radiation pattern of the radome structure of FIG. 6A.

FIG. 6A is a simplified representation of the seam locations of an exemplary three-layer radome after optimization by the method described in conjunction with FIG. 5. In FIG. 6A, the seams in the outer or upper radome layer occur at the $13^{th}$, $34^{th}$, $55^{th}$, and $71^{st}$ line arrays, the seams in the middle or central layer occur at the $20^{th}$, $39^{th}$, $52^{nd}$, and $71^{st}$ line arrays, and the seams in the innermost or lowermost layer occur at the twelfth, $30^{th}$, $50^{th}$, and $71^{st}$ line arrays. FIG. 6B is a notional illustration of the computer-derived sidelobes attributable to the radome of FIG. 6A. The main lobe is illustrated as 610.

A method for determining the location of seams (21, 210) in a multilayer radome (10) for an array (16) of radiating elements, the radome (10) having thickness and first and second lateral dimensions defining broad sides ($\mathbf{10}_{OLU}$, for example). The method comprises the step of quantizing (514) the thickness of the radome (10) into plural layers (3 in the example), each layer (such as $\mathbf{10}_{OL}$, $\mathbf{10}_{ML}$, $\mathbf{10}_{IL}$) having characteristics (such as dielectric constant) different from those of adjacent layers. For each of the layers of the radome, a plurality of different possible radome (10) seam (21) location combinations are generated (516), where each of the seams (21) overlies a line array (210) of the array (12), to thereby generate a population of possible radomes (10). At least two child radomes (10) are created from each pair of parent radomes (10) in the population. An image (matrix of FIG. 2B) is formed from each parent and child radome (10) in each population. Each of the images is two-dimensional Fourier transformed, to thereby generate Fourier transformed images. Each of the Fourier transformed images is assessed by means of an optimization process (518) to thereby select an optimal radome (10) seam combination defining the seam locations in each layer of the radome (10). A radome (10) is made (520) having the selected number of layers with the selected characteristics and having the optimal radome (10) seam (21) locations in relation to the line arrays (210).

In a particular mode of this method, the step of forming an image comprises the further steps of generating a matrix (FIG. 2B) with a number of rows corresponding to the number of layers in the radome (10) and with a number of columns corresponding to the number of radiating elements (210) lying under the radome (10). In each column of the matrix (FIG. 2B) representing a seam (21) overlying a radiating element (210), entering ones in the row corresponding to the layer in which the seam occurs. In each column of the matrix representing a radiating element affected by the presence of an adjacent seam (21), entering ones in the row corresponding to the layer in which the seam occurs. Zeroes are entered in those rows and columns of the matrix corresponding to radome (10) layers overlying radiating elements in which there are no seams, and adjacent elements (21).

According to another aspect of the invention, a method for making a radome (10) for an array antenna (12) including a plurality of line arrays (210) comprises the steps of selecting characteristics (512) of the array antenna (12), and the number and characteristics of the layers of the radome (10). The method also includes the steps of quantizing (514) the thickness of the radome (10) into layers, and generating (516) a plurality of possible seam (21) location combinations, where each seam (21) location overlies one of the line arrays (210). The seam (21) locations are optimized (518) to minimize the effect of the radome (10) on the array antenna (12). A radome (10) is made for the array antenna (12) with the seams (21) at the optimized locations. In a particularly advantageous mode of this aspect of the method of the invention, the step of optimizing (518) includes the step of using a genetic algorithm (502).

In this particularly advantageous mode, the genetic algorithm includes the steps of creating a generation of a particular size (560) in which radomes (10) have locations overlying line arrays (210). Parent couples are determined in the generation (564). For each of the parent couples, children are created, preferably by a crossover approach (566). The children to create mutated children (568), and the mutated children are inserted into the population (570) of a generation to thereby create a further population. A cost function or function of the further population is evaluated (572), where the cost factor is the maximum amplitude or level of any sidelobes other than the main lobe. A number of people having the lowest cost are selected or kept from the further population (574), to form a new generation. The steps of determining parent couples, creating children, mutating children, inserting, evaluating a cost function, and keeping a number of people having the lowest cost are repeated (576, 577). After the last repetition, the optimum seam location is deemed to be the one having the lowest cost factor (578), and a physical radome is made (520).

A protective cover (10) for an array antenna (12) according to an aspect of the invention comprises a first, protective outer dielectric layer (10$_{OL}$) made from separate sheets (10$_{OL1}$, 10$_{OL2}$) of first dielectric material joined together at seams (21). A second, middle dielectric layer (10$_{ML}$) is provided, made from separate sheets of second dielectric material joined together at seams (21), where the second dielectric material has different characteristics from the first dielectric material. A third, inner layer of radome (10$_{IL}$) is provided, which third layer is made of separate sheets of third dielectric material joined together at seams (21), where the third dielectric material has different characteristics from at least the second dielectric material. A first broad surface of the middle dielectric layer (10$_{ML}$) is juxtaposed with a broad surface of the outer dielectric layer (10$_{OL}$), and a broad surface of the inner layer (10$_{IL}$) is juxtaposed with a second broad surface of the middle layer (10$_{ML}$), with the seams (21) of the outer, middle and inner layers being nonregistered. In a particularly advantageous embodiment of this cover, the seams (21) of the outer (10$_{OL}$), middle (10$_{ML}$) and inner (10$_{IL}$) layers are each centered over a line array (210) of the array antenna (12).

What is claimed is:

1. A method for determining the location of seams in a multilayer radome for an array of radiating elements, said radome having thickness and first and second lateral dimensions defining broad sides, said method comprising the steps of:

quantizing the thickness of said radome into plural layers, each layer having characteristics different from those of adjacent layers;

for each of said layers, generating a plurality of different possible radome seam location combinations, where each of said seams overlies a line array of said array, to thereby generate a population of possible parent radomes;

creating at least two child radomes from each pair of parent radomes in said population;

forming an image from each parent and child radome in each population;

two-dimensional Fourier transforming each of said images, to thereby generate Fourier transformed images;

assessing each of said Fourier transformed images by means of an optimization process to thereby select an optimal radome seam combination defining the seam locations in each layer of said radome; and making a radome having the optimal radome seam locations.

2. A method according to claim 1, wherein said step of forming an image comprises the further steps of:

generating a matrix with a number of rows corresponding to the number of layers in the radome and with a number of columns corresponding to the number of line arrays lying under the radome;

in each column of said matrix representing a seam overlying a radiating element, entering ones in the row corresponding to the layer in which the seam occurs;

in each column of said matrix representing a radiating element affected by the presence of an adjacent seam, entering ones in the row corresponding to the layer in which the seam occurs; and entering zeroes in those rows and columns of said matrix corresponding to radome layers overlying line arrays in which there are no seams.

3. A method for making a radome having thickness for an array antenna including a plurality of line arrays, said method comprising the steps of:

selecting characteristics of said array antenna, and the number and characteristics of the layers of said radome;

quantizing the thickness of said radome into the layers, each of the layers including several sheets joined together with seams;

generating a plurality of possible seam location combinations, where the seam locations are placed in the layers, where each seam location overlies one of said line arrays and where each all seam locations in the layers are staggered;

optimizing said seam locations to minimize the effect of said radome on said array antenna; and making a radome for said array antenna with said seams at the optimized locations.

4. A method according to claim 3, wherein said step of optimizing includes the step of using a genetic algorithm.

5. A method according to claim 4, wherein said genetic algorithm includes the steps of:

creating a generation of a particular size in which radomes have locations overlying line arrays;

in said generation, determining parent couples;

for each of said parent couples, creating children by a crossover approach;

mutating said children to create mutated children;

inserting said mutated children into the population of a generation to thereby create a further population;

evaluating a cost function of said further population, where the cost factor is the maximum level of all sidelobes other than the main lobe;

keeping a number of people having the lowest cost from said further population, to form a new generation;

repeating said steps of determining parent couples, creating children, mutating children, inserting, evaluating a cost function, and keeping a number of people having the lowest cost; and after the last repetition, selecting as the optimum seam location the characteristics of the person having the lowest cost factor.

6. A method for determining the location of seams in a multilayer radome for an array of radiating elements, said radome having thickness, said method comprising the steps of:

quantizing the thickness of said radome into plural layers;

for each of said layers, generating a plurality of different possible radome seam location combinations to generate a population of possible parent radomes;

creating at least two child radomes from each pair of parent radomes in said population;

forming an image from each parent and child radome in each population;

Fourier transforming each of said images to generate Fourier transformed images;

assessing each of said Fourier transformed images to select an optimal radome seam combination defining the seam locations in each layer of said radome; and making a radome having the optimal radome seam locations.

* * * * *